3,637,705
N-3,4-DIHALO PHENYL PIPERAZINES

Bruce Wayne Horrom, Waukegan, and Howard Bernard Wright, Gurnee, Ill., assignors to Abbott Laboratories, Chicago, Ill.
No Drawing. Filed Oct. 1, 1968, Ser. No. 764,323
Int. Cl. C07d 51/70
U.S. Cl. 260—268 PH         2 Claims

ABSTRACT OF THE DISCLOSURE

It has been found that certain specifically halogen substituted N-phenylpiperazines and N-phenyl-N'-tetrahydropyranylpiperazines have unusually strong anorexigenic properties. The specific substituents must be in the 3- and 4-positions of the phenyl ring to produce these outstanding pharmacological results.

---

The present invention is directed to highly anorexigenic compounds of the formula

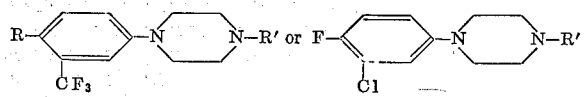

wherein R is fluorine, bromine or chlorine, and R' is hydrogen or 2-tetrahydropyranyl and to the non-toxic acid addition salts thereof.

The specific compounds mentioned above are characterized by carrying two different halogen substituents in the phenyl ring in the meta- and para-positions of that ring. The trifluoromethyl group is, for the purpose of the present disclosure, intended to be included in the term "halogen substituent." These compounds, when administered orally or parenterally exhibit strong appetite depressant activity without the pronounced stimulating effects usually accompanying appetite depressants. The new compounds are also characterized in having a very high therapeutic index, i.e., they are highly active at a dose which is extremely low when compared to their toxicity. Excellent anorexigenic activities are produced by orally administering between 0.2 and 5 mg./kg. to warm-blooded animals.

The new compounds are made by reacting a 3,4-dihalogen substituted aniline with diethanolamine or bis(2-chloroethylamine) and, if desired, condensing the obtained 3,4-disubstituted phenylpiperazine with 2-hydroxytetrahydropyran. A more detailed description of the procedure will be apparent from the following examples which are added here as illustrations. In these examples, all temperatures are given in the centigrade scale and all solution concentrations used in the physiological tests are given in percent weight per colume.

EXAMPLE 1

N-(4-fluoro-3-trifluoromethylphenyl)-piperazine

A mixture of 100 g. of 4-fluoro-3-trifluoromethylaniline and 66 g. of diethanolamine is stirred and heated with 200 ml. of 48% aqueous hydrobromic acid. The reaction temperature is raised to 190° within a period of about two hours, permitting the removal of water and hydrobromic acid. The residue is poured onto water and cooled until a precipitate forms. The precipitate is filtered and recrystallized from water after colored impurities are removed by a charcoal treatment. The obtained hydrobromide salt of N-(4-fluoro-3-trifluoromethylphenyl)-piperazine is obtained in a yield of 38% of theory and melts at 284–5°.

To obtain the base, the aqueous solution of the above material is treated with dilute sodium hydroxide and extracted with ether or benzene. The pure base is obtained by distillation.

In order to test the anorexigenic activity, the hydrobromide salt of the above compound was administered orally to several groups of rats which had previously been put on a standard feeding pattern for seven days: food was offered to the rats for five hours daily and the quantity consumed in the first two hours was measured for each group of four animals. On the test day, the animals were given oral doses of 0.5, 1.0 and 2.0 mg./kg. of the above compound 30 minutes before feeding time, and the food intake in the first two hours was again measured. The group of rats receiving 0.5 mg./kg. showed a 54.9% decrease of food intake over their normal intake; the group treated with 1.0 mg./kg. showed a decrease of 63.4% and the group with 2.0 mg./kg. showed a 76.8% decrease of food intake.

When the above compound was injected subcutaneously to rats as a 0.5–0.2% solution, the following results were obtained: the animals treated with 0.5 mg./kg. (0.05% solution) showed a 65.5% decrease in food intake; the animals injected with 1.0 (0.1% solution) and 2.0 mg./kg. (0.2% solution), respectively, showed 78.7 and 98.6% decrease of food intake. The same experiment repeated with dogs which were injected subcutaneously with 0.5, 1.0 and 2.0 mg./kg. as a normal saline solution showed 50.0, 85.9 and 95.8% decrease in food intake.

Toxicity of the above salt was determined in mice; the $LD_{50}$ for oral administration is 150 mg./kg. and the effective dose at which 50% decrease in food intake occurs ($ED_{50}$) is determined from the graph established with the figures from the above oral administration to rats at 0.4 mg./kg. The therapeutic index is 375.

EXAMPLE 2

N-(4-fluoro-3-trifluoromethylphenyl)-N'-(2-tetrahydropyranyl)-piperazine

To a solution of 7 g. of the base of the compound of Example 1 in 30 mg. of methanol is added 3.1 g. of 2-hydroxytetrahydropyran. The mixture is stirred for 30 minutes and the methanol is then evaporated. The base N-(4-fluoro-3-trifluoromethylphenyl)-N'-(2-tetrahydropyranyl)-piperazine is obtained as an oil which cannot be crystallized (yield: 52% of theory). The microanalysis is in good agreement with that calculated for the compound of empirical formula $C_{16}H_{20}F_4N_2O$.

The oral $LD_{50}$ is above 300 mg./kg. and the compound shows similar anorexigenic properties as shown for the compound of Example 1.

EXAMPLE 3

N-(4-bromo-3-trifluoromethylphenyl)-piperazine

A mixture of 48 g. of 4-bromo-3-trifluoromethylaniline and 35.7 g. of bis(2-chloroethyl)amine hydrochloride is refluxed for 24 hours in 150 ml. of n-butanol. The mixture is cooled, 13.8 g. of powdered potassium carbonate is added, and this mixture is refluxed for 48 hours and filtered hot. cooling, the hydrochloride of N-(4-bromo-3-trifluoromethylphenyl)piperazine is obtained in a yield of 24% of theory; it melts at 270–1°.

Administering this hydrochloride to rats analogous to the procedure shown in Example 1, the following decreases in food consumption are observed: 19.5% at 0.5 mg./kg.; 78.3% at 5 mg./kg. and 81% at 7.6 mg./kg.

EXAMPLE 4

N-(4-chloro-3-trifluoromethylphenyl)-piperazine

By replacing the 4-bromo-3-trifluoromethylaniline in Example 3 by an equimolar amount of 4-chloro-3-trifluoromethylaniline, the procedure of Example 3 produces the hydrochloride salt of 6-(4-chloro-3-trifluoromethylphenyl)-piperazine, melting at 284–5° (33% yield).

The oral $LD_{50}$ of this salt is 350 mg./kg. and the $ED_{50}$ is 1.25 mg./kg. The latter figure is established from the curve obtained by administering 1.0, 2.0 and 4.0 mg./kg. to groups of rats. Their respective food intake is decreased 47.7%, 57.8% and 79.9%, respectively over normal consumption. The therapeutic index of this compound is 280. By orally administering 0.5, 1.0 and 2.0 mg./kg. to dogs, the food intake decreases by 23.8%, 59.8% and 77.1%, respectively. In this instance, the compound is administered as a normal saline solution.

With intraperitoneal administration of 0.25, 0.5 and 1.0 mg./kg. to dogs as a normal saline solution, food intake decreases by 29.5%, 49.2% and 81.2%, respectively. In rats, the comparable figures after subcutaneous administration of 1.0, 2.0 and 4.0 mg./kg. are 89.9% 94.6% and 100%, respectively.

EXAMPLE 5

N-(4-chloro-3-trifluoromethylphenyl)-N'-(2-tetrahydropyranyl)-piperazine

By using the procedure of Example 2 with the base of Example 4, N-(4-chloro-3-trifluoromethylphenyl)-N'-(2-tertahydropyranyl)-piperazine is obtained in a yield of 79% of theory; this base has a melting point of 65° and a $LD_{50}$ of above 500.

When administering 2.5 mg./kg. of this compound orally to rats as a suspension in 0.3% tragacanth, the food intake decreases by 64.4%, at an oral dose of 5.0 mg./kg., food intake is decreased by 81.1%. The $ED_{50}$ is 1.25 mg./kg.; the therapeutic index is above 400.

EXAMPLE 6

N-(3-chloro-4-fluorophenyl)-piperazine

By using the process of Example 3 with 29 g. of 3-chloro-4-fluoroaniline and 35.7 g. of bis(2-chloroethyl)amine hydrochloride, the hydrochloride of N-(3-chloro-4-fluorophenyl)-piperazine is obtained in a yield of 54% of theory; it melts at 210–212° and has an oral $LD_{50}$ of 85.

Upon administration of 2.5 mg./kg. orally in normal saline solution to rats, their food intake decreases by 68.5%; with 5.0 mg./kg., food intake decreases by 93.7%. The $ED_{50}$ is about 1.4 and the therapeutic index is about 60.

EXAMPLE 7

N-(3-chloro-4-fluorophenyl)-N'-(2-tetrahydropyranyl)-piperazine

By following the procedure of Example 2 with the compound of Example 6, N-(3-chloro-4-fluorophenyl)-N'-(2-tetrahydropyranyl)-piperazine is obtained; the base melts at 61–2°. The oral $LD_{50}$ is about 130 mg./kg. and the $ED_{50}$ is about 3.

In the above examples, the experiments involving dogs are carried out in the following manner: dogs were fasted overnight and placed in individual observation cages at the beginning of the experiments. Control observations were made for one hour prior to drug administration and food was shown at half hour intervals. Food and water were given to the dogs (the food for five minutes at half hour intervals) two hours after drug administration. Interest in food and food consumption was recorded every half hour.

It will be observed that the above described compounds have unusually high therapeutic indices or, expressed differently are effective at extremely low dosages relative to the toxicity of the compounds. The compounds wherein R' is 2-tetrahydropyranyl have relatively high molecular weights and it is therefore surprising to find that dosages as low as 0.5 mg./kg. show the unusually pronounced anorexigenic effects indicated above. These pyranylpiperazines clearly distinguish from those described in U.S. 3,253,989 in that they carry two different halogen atoms in the phenyl ring in specific positions of that ring. Analogous compounds carrying the above described substituents at different positions of the phenyl ring are much less effective and/or more toxic: the therapeutic indices of the new compounds are much greater than those of the compounds carrying only one halogen substituent in the phenyl ring or identical halogens in the same positions or halogens in different positions of the phenyl ring.

The compounds of the present invention can be administered intravenously, orally or subcutaneously. In most instances, oral administration is preferred. The compounds may be used as bases or as salt formed thereof with physiologically acceptable acids such as hydrochloric acid, tartaric acid, acetic acid, sulfuric acid, citric acid or phosphoric acid. These salts lend themselves to easy tableting in the usual fashion together with the necessary fillers, lubricants, excipients, flavoring agents and the like.

I claim:

1. A compound of the formula

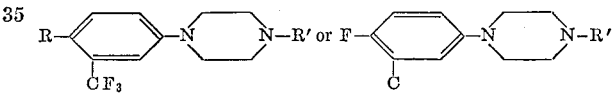

wherein R is fluorine, bromine or chlorine and R' is hydrogen or 2-tetrahydropyranyl or a non-toxic acid addition salt thereof.

2. The compound of claim 1 wherein one nitrogen of the piperazine moiety carries a 3-chloro-4-fluorophenyl substituent and the other nitrogen carries hydrogen of 2-tetrahydropyranyl.

References Cited

UNITED STATES PATENTS

| | | | |
|---|---|---|---|
| 3,037,981 | 6/1962 | Hayao | 260—268 |
| 3,170,926 | 2/1965 | Ash | 260—268 |
| 3,253,989 | 5/1966 | Moser | 260—268 X |
| 3,374,237 | 3/1968 | Wright | 260—268 |
| 3,478,032 | 11/1969 | Arya | 260—268 |

FOREIGN PATENTS

| | | | |
|---|---|---|---|
| 389,622 | 7/1965 | Switzerland | 260—268 PH |

DONALD G. DAUS, Primary Examiner

U.S. Cl. X.R.

260—268.51, 345.9; 424—250